United States Patent
Michiels et al.

(10) Patent No.: US 11,468,291 B2
(45) Date of Patent: Oct. 11, 2022

(54) METHOD FOR PROTECTING A MACHINE LEARNING ENSEMBLE FROM COPYING

(71) Applicant: NXP B.V., Eindhoven (NL)

(72) Inventors: Wilhelmus Petrus Adrianus Johannus Michiels, Reusel (NL); Gerardus Antonius Franciscus Derks, Dongen (NL)

(73) Assignee: NXP B.V., Eindhoven (NL)

( * ) Notice: Subject to any disclaimer, the term of this patent is extended or adjusted under 35 U.S.C. 154(b) by 959 days.

(21) Appl. No.: 16/145,287

(22) Filed: Sep. 28, 2018

(65) Prior Publication Data

US 2020/0104673 A1 Apr. 2, 2020

(51) Int. Cl.
| | |
|---|---|
| *G06N 3/02* | (2006.01) |
| *G06N 3/04* | (2006.01) |
| *G06N 20/00* | (2019.01) |
| *G06N 3/08* | (2006.01) |
| *G06N 5/04* | (2006.01) |

(52) U.S. Cl.
CPC ........... *G06N 3/0454* (2013.01); *G06N 3/084* (2013.01); *G06N 5/04* (2013.01); *G06N 20/00* (2019.01)

(58) Field of Classification Search
CPC ...... G06N 3/0454; G06N 20/00; G06N 3/084; G06N 5/04; G06N 20/20; G06N 20/10; G06N 5/003; G06F 7/582; G06F 7/58
See application file for complete search history.

(56) References Cited

U.S. PATENT DOCUMENTS

| | | |
|---|---|---|
| 7,644,051 B1 | 1/2010 | Moore et al. |
| 10,242,423 B2 | 3/2019 | Ould-Ahmed-Vall et al. |
| 10,303,953 B2 | 5/2019 | Varerkar et al. |
| 10,346,944 B2 | 7/2019 | Nurvitadhi et al. |
| 10,353,706 B2 | 7/2019 | Kaul et al. |
| 10,572,773 B2 | 2/2020 | Rohekar |

(Continued)

OTHER PUBLICATIONS

Myers S. (2001) Efficient Amplification of the Security of Weak Pseudo-random Function Generators. In: Pfitzmann B. (eds) Advances in Cryptology—EUROCRYPT 2001. EUROCRYPT 2001. Lecture Notes in Computer Science, vol. 2045. Springer, Berlin, Heidelberg, https://doi.org/10.1007/3-540-44987-6_22 (Year: 2001).*

(Continued)

*Primary Examiner* — Kakali Chaki
*Assistant Examiner* — Michael H Hoang
(74) *Attorney, Agent, or Firm* — Daniel D. Hill

(57) ABSTRACT

A method is provided for protecting a machine learning ensemble. In the method, a plurality of machine learning models is combined to form a machine learning ensemble. A plurality of data elements for training the machine learning ensemble is provided. The machine learning ensemble is trained using the plurality of data elements to produce a trained machine learning ensemble. During an inference operating phase, an input is received by the machine learning ensemble. A piecewise function is used to pseudo-randomly choose one of the plurality of machine learning models to provide an output in response to the input. The use of a piecewise function hides which machine learning model provided the output, making the machine learning ensemble more difficult to copy.

20 Claims, 4 Drawing Sheets

(56) References Cited

U.S. PATENT DOCUMENTS

| | | | | |
|---|---|---|---|---|
| 2011/0320184 | A1* | 12/2011 | Beyer | G06F 16/27 703/22 |
| 2016/0299255 | A1* | 10/2016 | Dail | G01N 21/31 |
| 2017/0132528 | A1* | 5/2017 | Aslan | G06N 20/00 |
| 2019/0095756 | A1* | 3/2019 | Agrawal | G06K 9/6269 |
| 2020/0026885 | A1 | 1/2020 | Michiels et al. | |

OTHER PUBLICATIONS

Boneh, Dan, and Brent Waters. "Constrained pseudorandom functions and their applications." International conference on the theory and application of cryptology and information security. Springer, Berlin, Heidelberg, 2013. https://link.springer.com/chapter/10.1007/978-3-642-42045-0_15 (Year: 2013).*

Wang, Yong, et al. "A pseudorandom number generator based on piecewise logistic map." Nonlinear Dynamics 83.4 (2016): 2373-2391. https://link.springer.com/content/pdf/10.1007/s11071-015-2488-0.pdf (Year: 2016).*

Eto, Riki et al.; "Fully-Automatic Bayesian Piecewise Sparse Linear Models;" 17th International Conference on Artificial Intelligence and Statistics (AISTATS); Reykjavik, Iceland; Apr. 22-25, 2014.

Harmon, Mark, et al.; "Activiation Ensembles for Deep Neural Networks;" Feb. 24, 2017 in arXiv; From the Internet: https://arxiv.org/abs/1702.07790.

Rouhani et al.; "DeepSigns: A Generic Watermarking Framework for Protecting the Ownership of Deep Learning Models;" Apr. 3, 2018, pp. 1-13, ARXIV.ORG, Cornell University Library, Ithaca, NY, USA.

Shirakawa et al.; "Dynamic Optimization of Neural Network Structures Using Probabilistic Modeling;" Jan. 23, 2018, pp. 1-9, ARXIV.ORG, Cornell University Library, Ithaca, NY, USA.

Notice of Allowance for 82116678US01, U.S. Appl. No. 16/040,992, filed Jul. 20, 2018, Inventors: Wilhelmus Petrus Adrianus Johannus Michiels et al.; Title: "Method For Making A Machine Learning Model More Difficult To Copy;" 5 Pages.

Binev, Peter, et al.; "Universal Algorithms for Learning Theory Part 1: Piecewise Constant Functions;" Jouirnal of Machine Learning Research 6; Published Sep. 2005; pp. 1297-1321.

Binev, Peter, et al.; "Universal Piecewise Polynomial Estimators for Machine Learning;" Dec. 13, 2006; Research supported by Office of Naval Research Contracts, AFOSR Contract, DARPA/NGA Contract; ARO/DoD Contract, National Science Foundation Grant, French-German PROCOPE Contract, and Leibniz Programme of the DFG.

Theano Development Team: AL-RFOU, Rami, et al.; "Theano: A Python Framework for Fast Computation of Mathematical Expressions;" arXiv:1605.02688v1 [cs.SC]; May 9, 2016.

Tramer, Florian, et al.; "Stealing Machine Learning Models via Prediction APIs;" Proceedings of 25th USENIX Security Symposium, 2016; arXiv:1609.02942v2 [cs.CR]; Oct. 3, 2016.

Wang, Yi, et al.; "Inference-Based Similarity Search in Randomized Montgomery Domains for Privacy-Preserving Biometric Identification;" IEEE Transactions on Pattern Analysis and Machine Intelligence (vol. 40, Issue: 7, Jul. 1, 2018); pp. 1611-1624; DOI: 10.1109/TPAMI.2017.2727048.

Notice of Allowance for U.S. Appl. No. 16/040,992, dated Jul. 23, 2020; 9 Pages.

Cao, Ning et al.; "Handling the adversarial attacks"; Published Feb. 16, 2018, vol. 10, No. 8, in the Journal of Ambient Intelligence and Humanized Computing; DOI:10.1007/S12652-018-0714-6.

* cited by examiner

METHOD FOR PROTECTING A MACHINE LEARNING ENSEMBLE FROM COPYING

BACKGROUND

Field

This disclosure relates generally to machine learning, and more particularly, to a method for protecting a machine learning ensemble from copying.

Related Art

Machine learning functionality is becoming more widely used in many of today's applications. Machine learning algorithms may be classified by how they are trained. Supervised learning, unsupervised learning, semi-supervised learning, and reinforcement learning are examples of training techniques. Training data is used for training the machine learning algorithm. A machine learning model is what is learned from training with the training data, and contains a parameter set for the machine learning algorithm. A neural network may be used in machine learning. Neural networks are used in the areas of supervised learning and reinforcement learning. The effectiveness of a machine learning algorithm is influenced by its accuracy, execution time, storage requirements, and the quality of the training data. The expertise and expense required for compiling a representative training set and labelling the data results in the training data and model obtained from the training data are valuable assets. Once an attacker has access, the machine learning model can be relatively easily copied. Black box access to the model may not provide sufficient protection. Also, a black box may not always be available to protect the model. Once an attacker has copied the model, it can be illegitimately monetized.

Therefore, a need exists for a method to better protect a machine learning model from being easily copied.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
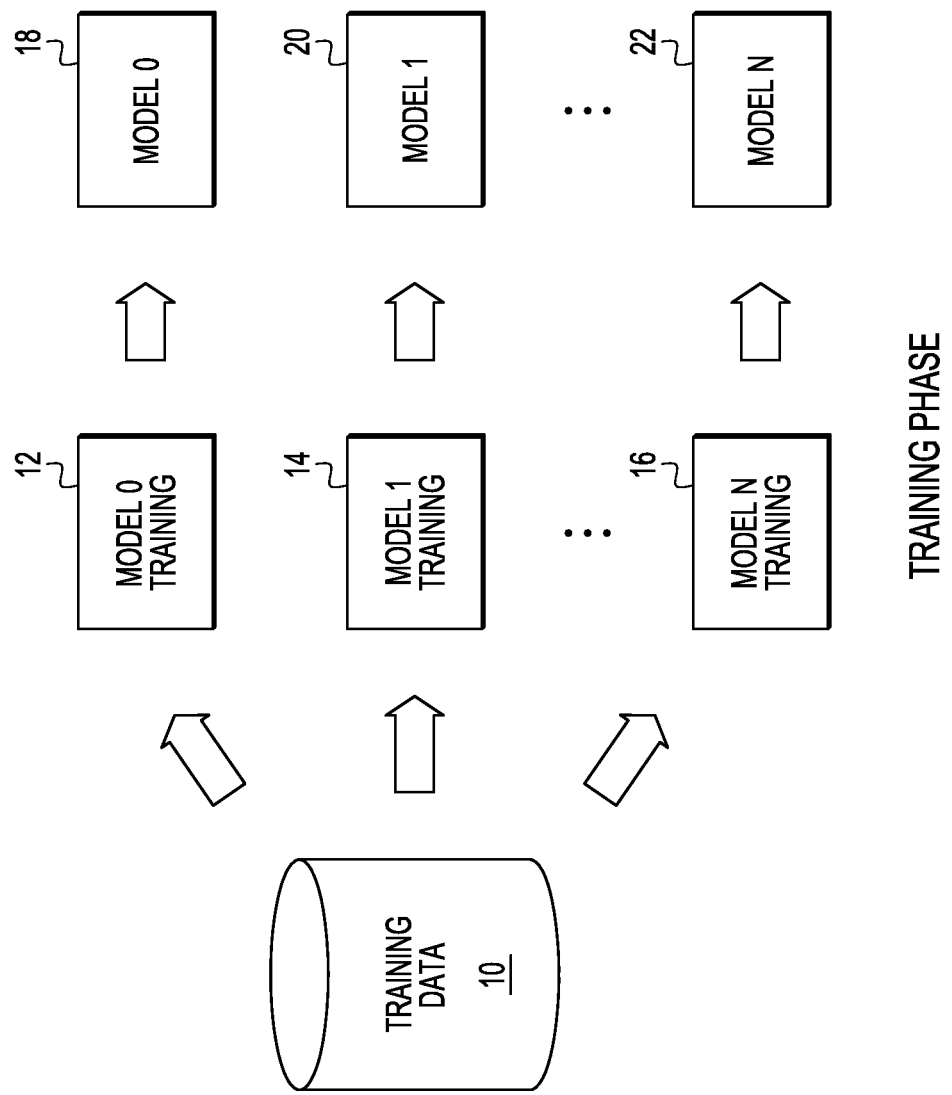
FIG. 1 illustrates a training operating phase of a machine learning ensemble in accordance with an embodiment.

Generally, there is provided, a method for protecting a machine learning ensemble from being copied. Each of a plurality of machine learning models in the ensemble are implemented differently so that they may produce a different output in response to receiving the same input. During inference operation of one embodiment of the machine learning ensemble, an input is provided to the plurality of machine learning models. Instead of using a deterministic approach to select which of the plurality of machine learning models to receive and process the input, the selection is done pseudo-randomly using a piecewise function. The piecewise function receives input as a seed. If an adversary provides the same input twice, it should result in the same output. In one embodiment, the piecewise function is a piecewise constant function. Using a piecewise function conceals from which regions of an input space the different machine learning algorithms provide a different output. This makes the machine learning ensemble more difficult to copy.

In accordance with an embodiment, there is provided, a method including: providing a plurality of data elements for training a plurality of machine learning models combined into a machine learning ensemble; training the machine learning ensemble using the plurality of data elements to produce a trained machine learning ensemble; and pseudo-randomly choosing, using a piecewise function, one of the plurality of machine learning models to provide an output in response to receiving an input during inference operation of the machine learning ensemble. The piecewise function may be further characterized as being a piecewise constant function. Each of the plurality of machine learning models may be a neural network. Each of the plurality of machine learning models may have different machine learning algorithms, and wherein the step of pseudo-randomly choosing may take the input as a seed for providing pseudo-randomness. The pseudo-random function may be defined as $F:2^S \to \{0, 1, k-1\}$ where s is a bit size of the input during the inference operation, and k is the number of machine learning models in the plurality of machine learning models. Training the machine learning ensemble may use a back-propagation training algorithm to produce the trained machine learning ensemble. Each of the plurality of machine learning models may use one of either a same training set selected from the plurality of data elements, different training sets that have one or more of the same data elements, and disjunct training sets. All the plurality of machine learning models may be binary classification models.

In another embodiment, there is provided, a method including: combining a plurality of machine learning models into a machine learning ensemble; providing a plurality of data elements for training the machine learning ensemble; training the machine learning ensemble using the plurality of data elements to produce a trained machine learning ensemble; receiving an input during inference operation of the machine learning ensemble; and pseudo-randomly choosing, using a piecewise constant function, one of the plurality of machine learning models to provide an output in response to the input. Each of the plurality of machine learning models may be a neural network. Each of the plurality of machine learning models may have different machine learning algorithms, and wherein the step of pseudo-randomly choosing may take the input as a seed for providing pseudo-randomness. The pseudo-random function may be defined as $F:2^S \to \{0, 1, k-1\}$ where s is a bit size of the input during the inference operation, and k is the number of machine learning models in the plurality of machine learning models. Training the machine learning ensemble may use a back-propagation training algorithm to produce the trained machine learning ensemble. Each of the plurality of machine learning models may use one of either a same training set selected from the plurality of data elements, different training sets that have one or more of the same data elements, and disjunct training sets. All the plurality of machine learning models may be binary classification models.

In yet another embodiment, there is provided, a method including: combining a plurality of machine learning models into a machine learning ensemble; providing a plurality of data elements for training the machine learning ensemble, each of the plurality of machine learning models are implemented differently; training the machine learning ensemble using the plurality of data elements to produce a trained machine learning ensemble; receiving an input during inference operation of the machine learning ensemble; and pseudo-randomly choosing, using a piecewise constant function, one of the plurality of machine learning models to provide an output in response to the input. Each of the plurality of machine learning models may be implemented with different machine learning algorithms, and wherein the step of pseudo-randomly choosing may take the input as a seed for providing pseudo-randomness. Training the machine learning ensemble may use a back-propagation training algorithm to produce the trained machine learning ensemble. Each of the plurality of machine learning models may use one of either a same training set selected from the plurality of data elements, different training sets that have one or more of the same data elements, and disjunct training sets. All the plurality of machine learning models may be binary classification models.

Machine learning algorithms may be used in many different applications, such as prediction algorithms and classification algorithms. Machine learning models learn a function which correctly maps a given input value to an output value using training data. The learned function can be used to categorize new data, for example, photos or pictures of dogs and cats.

Machine learning ensembles combine multiple machine learning model implementations into one predictive model. There are various ways an output can be generated from the multiple machine learning models in the ensemble. One common way to compute the output is to use a majority voting strategy where an output decision is based on which output receives the highest number of votes among the multiple machine learning models. The goal of a machine learning ensemble is to obtain better performance than would be provided by the constituent machine learning algorithms.

In a machine learning model implemented remotely, such as in the cloud or in a black box, access is only available to the input and output values of the model. A goal of model extraction, or model cloning, is to extract the functionality of the machine learning model as accurately as possible by providing queries to the machine learning model and storing the returned outputs. The resulting input/output pairs of data can be used to train another machine learning model which in terms of functionality is close to the original model. Hence, the cloned model is likely to work correctly for the original input values.

As described below, to make copying of the model more difficult, instead of using a deterministic approach to decide the output of a machine learning ensemble, a pseudo-random approach is used, where the pseudo-random choice is based on a piecewise function. The use of the piecewise function hides which models the outputs come from.

FIG. 1 illustrates a training operating phase of a machine learning ensemble in accordance with an embodiment. In FIG. 1, training data 10 is used by machine learning algorithms represented by machine learning algorithms 12, 14, and 16 to train a plurality of machine learning models represented by machine learning models 18, 20, and 22. There are various types of machine learning algorithms that may be used, such as for example, neural networks, decision trees, and support vector machines. In one embodiment, machine learning algorithms 12, 14, and 16 are different neural network algorithms. In another embodiment, the machine learning algorithms 12, 14, and 16 may be the same neural network algorithm with different parameters. A back-propagation algorithm may be used in neural networks to calculate a gradient that is used in the weights. In one embodiment, machine learning models 12, 14, and 16 provide a binary classification, i.e., {0,1}. In another embodiment, machine learning models 12, 14, and 16 may provide more than two classifications.

Training data 10 includes a plurality of data elements stored in a memory. There are various ways training data 10 can be provided to machine learning algorithms 12, 14, and 16. For example, a training set may be selected from training data 10. The training set may be all, or a subset, of the training data. Each of models 18, 20, and 22 may use the same training set or different training sets. The different training sets may be overlapping or may be entirely disjunct. After machine learning models 12, 14, and 16 are trained, the machine learning ensemble is ready to be used for inference phase operation.

Figure 2:
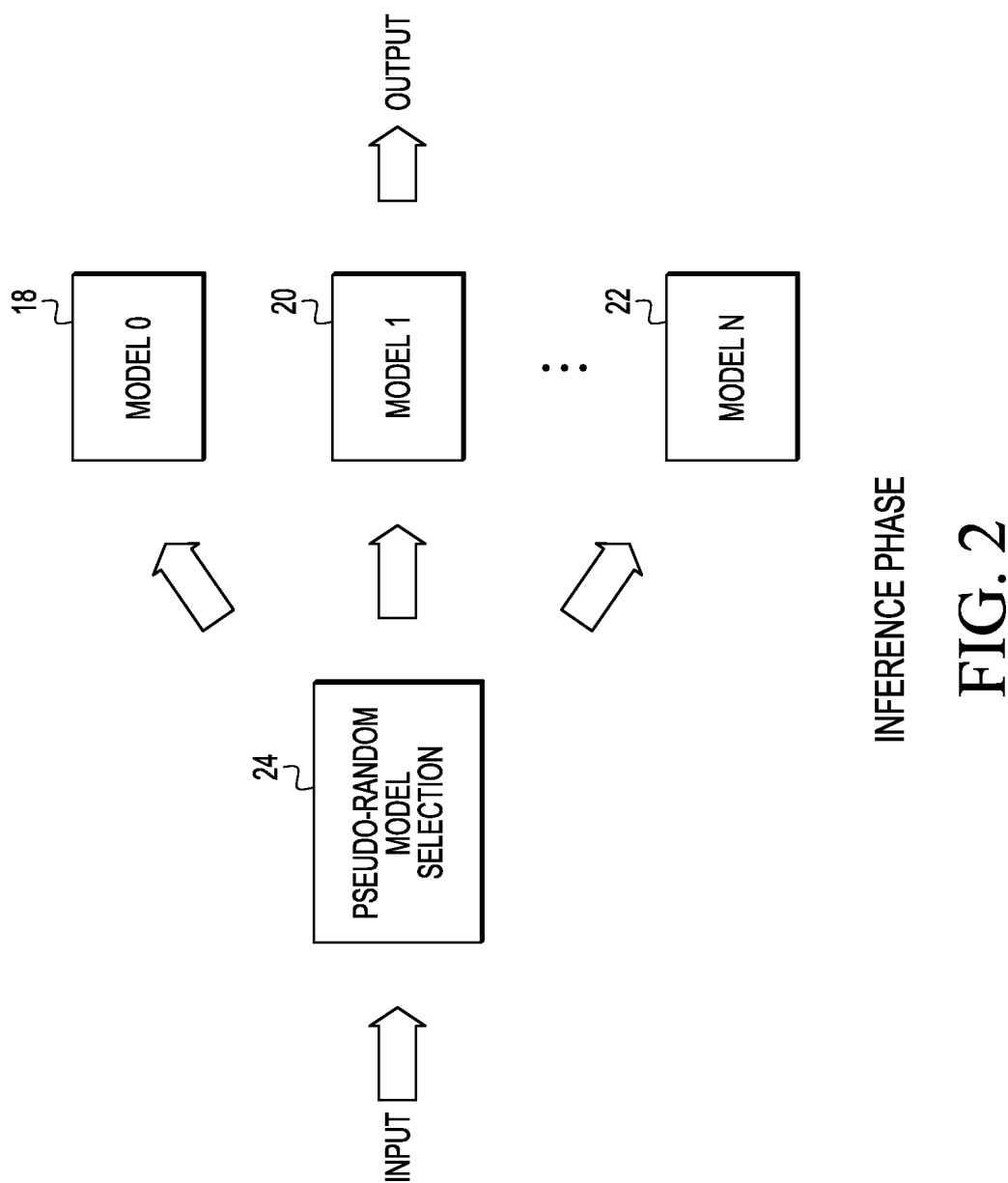
FIG. 2 illustrates an inference operating phase of a machine learning ensemble in accordance with an embodiment.

FIG. 2 illustrates an inference operating phase of a machine learning ensemble in accordance with an embodiment. Machine learning models 12, 14, and 16 were first trained as described above in the discussion of FIG. 1. Instead of using a deterministic function to determine which model output (OUTPUT) to use, a pseudo-random function is used to select which machine learning algorithm to execute. In one embodiment, the pseudo-random function is a piecewise function defined as $F:2^S \rightarrow \{0, 1, k-1\}$ where s is a bit size of the input during the inference operation, and k is the number of machine learning models in the plurality of machine learning models of the ensemble. In one embodiment regarding image training data, for each pixel of an image, a range of possible pixel values is split into a random number of intervals. The intervals are labeled either "0" or "1". Consider a single input feature and suppose that its value is changed in infinitely small steps. Then, the outcome of the pseudo-random function changes value only at the moment an interval boundary is passed. Between interval boundaries, the output is constant. Let, for a given input x, $s\_x$ be the sum of the labels of the intervals in which the input features are contained. Then function $F(x)$ is defined as $s\_x$ mod 3. Hence, over the range of the input value, the pseudo-random function is piecewise constant. The result of the pseudo-random function is used by pseudo-random model selection 24 to direct an input (INPUT) to one of models 12, 14, and 16. The input is used as a seed for the generated pseudo-randomness. Using the piecewise function hides that different models give different answers in a region of the input space. Such information would help the adversary to focus on the part where models give the same outcome, which would turn the ensemble technique ineffective. In one implementation, function F is chosen such that it is a piecewise constant on each input feature. Note, as mentioned above, that completely different models are not necessary to have in the ensemble. Models that are only partly different also provide a benefit. For instance, in a convolutional neural network, only the final part of the model with fully connected layers (FCL) may be different. In that case, only a small part of the model needs to have multiple implementations. Also, when the models are not completely distinct from each other, the models can overlay to save storage. In addition, different neural network architectures may be implemented for different algorithms in the ensemble.

Figure 3:
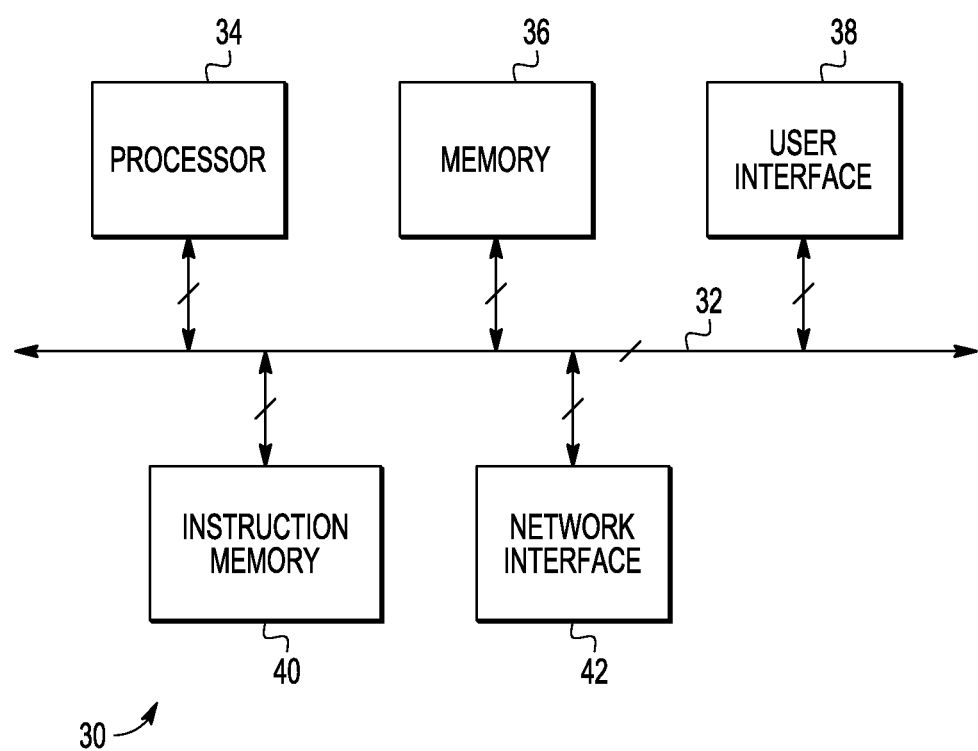
FIG. 3 illustrates a data processing system for use in implementing the machine learning ensemble in accordance with an embodiment.

FIG. 3 illustrates data processing system 30 for use in implementing the machine learning ensemble in accordance with an embodiment. Data processing system 30 may be implemented on one or more integrated circuits and may be used in an implementation of the machine learning ensemble. Data processing system 30 includes bus 32. Connected to bus 32 is processor 34, memory 36, user interface 38, instruction memory 40, and network interface 42. Processor 34 may be any hardware device capable of executing instructions stored in memory 36 or instruction memory 40. For example, processor 34 may execute the machine learning algorithms using training data stored in memory 36. Processor 34 may have multiple processing cores. Processor 34 may be, for example, a microprocessor, field programmable gate array (FPGA), application-specific integrated circuit (ASIC), or similar device. Processor 34 may be implemented in a secure hardware element and may be tamper resistant.

Memory 36 may be any kind of memory, such as for example, L1, L2, or L3 cache or system memory. Memory 36 may include volatile memory such as static random-access memory (SRAM) or dynamic RAM (DRAM), or may include non-volatile memory such as flash memory, read only memory (ROM), or other volatile or non-volatile memory. Also, memory 36 may be implemented in a secure hardware element. Alternately, memory 36 may be a hard drive implemented externally to data processing system 30. In one embodiment, memory 36 is used to store training data 10.

User interface 38 may be connected to one or more devices for enabling communication with a user such as an administrator. For example, user interface 38 may be enabled for coupling to a display, a mouse, a keyboard, or other input/output device. Network interface 42 may include one or more devices for enabling communication with other hardware devices. For example, network interface 42 may include, or be coupled to, a network interface card (NIC) configured to communicate according to the Ethernet protocol. Also, network interface 42 may implement a TCP/IP stack for communication according to the TCP/IP protocols. Various other hardware or configurations for communicating are available.

Instruction memory 40 may include one or more machine-readable storage media for storing instructions for execution by processor 34. In other embodiments, both memories 36 and 40 may also store data upon which processor 34 may operate. Memories 36 and 40 may store, for example, one or more machine learning models, training data, or encryption, decryption, and verification applications. Memory 40 may be implemented in a secure hardware element and be tamper resistant.

Figure 4:
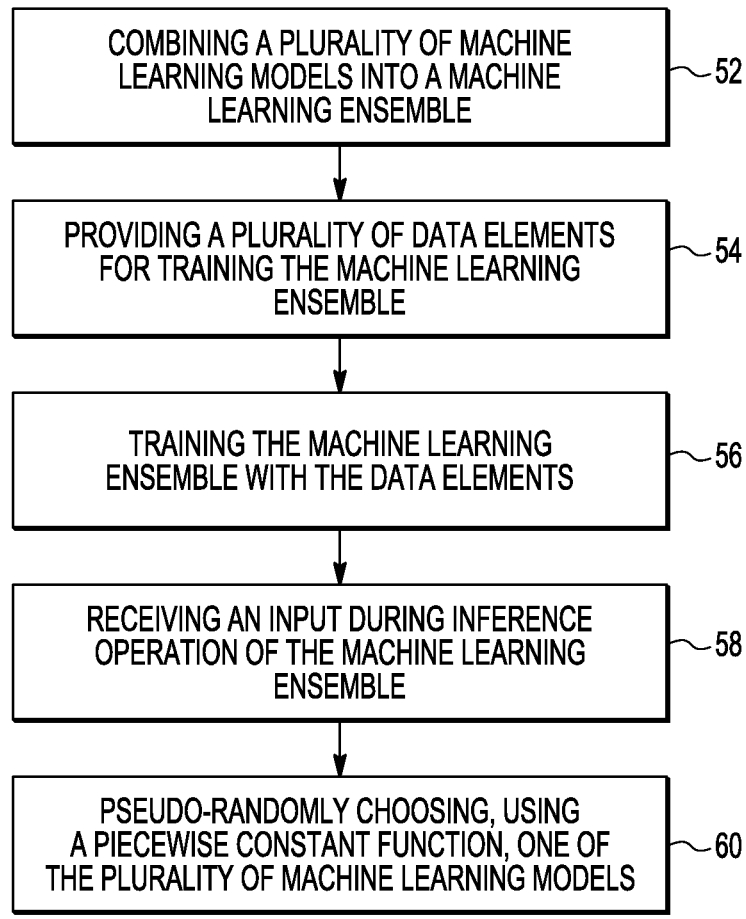
FIG. 4 illustrates a method for inference operation of a machine learning ensemble in accordance with an embodiment.

FIG. 4 illustrates method 50 for inference phase operation of a machine learning ensemble in accordance with an embodiment. Method 50 begins at step 52. At step 52, a plurality of machine learning models is combined into a machine learning ensemble. The machine learning models may be neural networks. At step 54, a plurality of data elements is provided for training the machine learning ensemble. At step 56, the machine learning ensemble is trained using a training set of the data elements. At step 58, an input (labeled INPUT in FIG. 2) is received by the machine learning ensemble during inference operation of the machine learning ensemble. At step 60, one of the machine learning models is chosen to provide an output (labeled OUTPUT in FIG. 2) in response to the input. The machine learning model is chosen pseudo-randomly using a piecewise function. In one embodiment, the piecewise function is a piecewise constant function. Using a piecewise function to choose the output hides which machine learning model was chosen. Hiding the chosen machine learning model makes the machine learning algorithm more difficult to copy.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, NVM, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method comprising:
   providing a plurality of data elements for training a plurality of machine learning models combined into a machine learning ensemble;
   training the plurality of machine learning models of the machine learning ensemble using the plurality of data elements to produce a trained machine learning ensemble; and
   pseudo-randomly choosing, using a piecewise function, only one machine learning model of the plurality of machine learning models to receive an input, process the input, and provide an output in response to receiving the input during inference operation of the machine learning ensemble.

2. The method of claim 1, wherein the piecewise function is further characterized as being a piecewise constant function.

3. The method of claim 1, wherein each of the plurality of machine learning models is a neural network.

4. The method of claim 1, wherein each machine learning model of the plurality of machine learning models has a different machine learning algorithm, and wherein the step of pseudo-randomly choosing takes the input as a seed for providing pseudo-randomness.

5. The method of claim 1, wherein the pseudo-random function is defined as $F:2^S \rightarrow \{0, 1, k-1\}$ where s is a bit size of the input during the inference operation, and k is the number of machine learning models in the plurality of machine learning models.

6. The method of claim 1, wherein training the machine learning ensemble uses a back-propagation training algorithm to produce the trained machine learning ensemble.

7. The method of claim 1, wherein the training of each machine learning model of the plurality of machine learning models uses one of either a same training set selected from the plurality of data elements, different training sets that have one or more of the same data elements, and disjunct training sets.

8. The method of claim 1, wherein all machine learning models of the plurality of machine learning models are binary classification models.

9. A method comprising:
combining a plurality of machine learning models into a machine learning ensemble;
providing a plurality of data elements for training the plurality of machine learning models of the machine learning ensemble;
training the machine learning ensemble using the plurality of data elements to produce a trained machine learning ensemble;
receiving an input during inference operation of the machine learning ensemble; and
pseudo-randomly choosing, using a piecewise constant function, only one machine learning model of the plurality of machine learning models to receive the input, process the input, and provide an output in response to the input.

10. The method of claim 9, wherein each of the plurality of machine learning models is a neural network.

11. The method of claim 9, wherein each machine learning model of the plurality of machine learning models has a different machine learning algorithm, and wherein the step of pseudo-randomly choosing takes the input as a seed for providing pseudo-randomness.

12. The method of claim 9, wherein the pseudo-random function is defined as $F:2^S \rightarrow \{0, 1, k-1\}$ where s is a bit size of the input during the inference operation, and k is the number of machine learning models in the plurality of machine learning models.

13. The method of claim 9, wherein training the machine learning ensemble uses a back-propagation training algorithm to produce the trained machine learning ensemble.

14. The method of claim 9, wherein the training of each machine learning model of the plurality of machine learning models uses one of either a same training set selected from the plurality of data elements, different training sets that have one or more of the same data elements, and disjunct training sets.

15. The method of claim 9, wherein all machine learning models of the plurality of machine learning models are binary classification models.

16. A method comprising:
combining a plurality of machine learning models into a machine learning ensemble;
providing a plurality of data elements for training the plurality of machine learning models of the machine learning ensemble, each machine learning model of the plurality of machine learning models are implemented differently;
training the plurality of machine learning models of the machine learning ensemble using the plurality of data elements to produce a trained machine learning ensemble;
receiving an input during inference operation of the machine learning ensemble; and
pseudo-randomly choosing, using a piecewise constant function, only one machine learning model of the plurality of machine learning models to receive the input, process the input, and provide an output in response to the input.

17. The method of claim 16, wherein each machine learning model of the plurality of machine learning models is implemented with a different machine learning algorithm, and wherein the step of pseudo-randomly choosing takes the input as a seed for providing pseudo-randomness.

18. The method of claim 16, training the plurality of machine learning models of the machine learning ensemble uses a back-propagation training algorithm to produce the trained machine learning ensemble.

19. The method of claim 16, wherein each machine learning model of the plurality of machine learning models uses one of either a same training set selected from the plurality of data elements, different training sets that have one or more of the same data elements, and disjunct training sets.

20. The method of claim 16, wherein all machine learning models of the plurality of machine learning models are binary classification models.

* * * * *